United States Patent [19]

Washita et al.

[11] Patent Number: 4,600,653
[45] Date of Patent: Jul. 15, 1986

[54] LAMINATED SAFETY GLASS

[75] Inventors: Hiroshi Washita; Kaoru Oguro, both of Yokohama, Japan

[73] Assignee: Asahi Glass Company Ltd., Tokyo, Japan

[21] Appl. No.: 686,997

[22] Filed: Dec. 27, 1984

[30] Foreign Application Priority Data

Jan. 27, 1984 [JP] Japan .................................. 59-12003

[51] Int. Cl.[4] .................... B32B 17/10; B32B 27/40
[52] U.S. Cl. ................................ 428/425.6; 428/332
[58] Field of Search ....................... 428/425.6, 332

[56] References Cited

U.S. PATENT DOCUMENTS

| | | | |
|---|---|---|---|
| 3,764,457 | 10/1973 | Chang et al. | 428/412 |
| 4,103,070 | 7/1978 | Ammons | 428/425.6 |
| 4,160,853 | 7/1979 | Anmons | 428/425.6 |
| 4,254,176 | 5/1981 | Müller et al. | 428/425.6 |

Primary Examiner—Allan M. Lieberman
Attorney, Agent, or Firm—Oblon, Fisher, Spivak, McClelland & Maier

[57] ABSTRACT

Laminated safety glass having an at least two-layered structure comprising an inorganic glass layer and a synthetic resin layer, and having an inorganic glass surface on one side and a synthetic resin surface on the other side, characterized in that the major portion of the synthetic resin layer comprises a polyurethane type thermoplastic resin, said polyurethane type thermoplastic resin being a resin obtained from a high molecular weight diol composed of a combination of from 40 to 70% by weight of a poly(1,6-hexylene carbonate)diol and from 30 to 60% by weight of a polyester diol, a chain extender, and a non-yellowing type diisocyanate compound, as essential starting materials.

13 Claims, 4 Drawing Figures

LAMINATED SAFETY GLASS

The present invention relates to laminated safety glass having a synthetic resin surface on one side. More particularly, the present invention relates to laminated safety glass wherein the major portion of a synthetic resin layer is made of a certain specific polyurethane type thermoplastic resin.

Laminated safety glass having an at least two-layered structure comprising an inorganic glass (hereinafter referred to simply as "glass") layer and a synthetic resin layer, and having a glass surface on one side and a synthetic resin surface on the other side, is referred to as resin-laminated glass. Such resin-laminated glass has become attractive as a prospective window material for automobiles, instead of so-called two-ply glass comprising a laminate body of a pair of glass sheets and an intermediate film interposed between them. A synthetic resin layer in the resin-laminated glass is usually made of a polyurethane type synthetic resin, mainly a polyurethane type thermoplastic synthetic resin. For the purpose of improving the surface properties, there has been known resin-laminated glass having a two-layered structure comprising a polyurethane type thermoplastic synthetic resin layer and a polyurethane type thermosetting synthetic resin layer (see U.K. Pat. No. 1,576,394). However, the major mechanical properties of the resin-laminated glass, such as impact resistance or penetration resistance, are dependent on the polyurethane type thermoplastic resin. Whereas, the polyurethane type thermosetting resin is effective for improving the surface properties, but it is not satisfactory for other mechanical properties. As the polyurethane type thermoplastic resin useful for resin-laminated glass, it has been common to use a polyurethane type thermoplastic resin obtained by the reaction of three components i.e. a high molecular weight diol, a chain extender and a non-yellowing type diisocyanate compound. However, it has been proposed to employ a polyurethane type thermoplastic resin wherein a high molecular weight polycarbonate diol is used instead of the high molecular weight polyester diol (see U.S. Pat. Nos. 3,764,457 and 4,103,070).

As mentioned above, the thermoplastic resin for resin-laminated glass is required to have not only mechanical properties such as impact strength or penetration resistance, but also various other properties such as transparency, stability against hydrolysis, weather resistance or processability. Under the circumstances, the present inventors have conducted extensive researches for a polyurethane type thermoplastic resin useful for the resin-laminated glass which satisfies all the above-mentioned requirements, and have finally found a certain specific polyurethane type thermoplastic resin having practically the most excellent properties. The present invention is concerned with resin-laminated glass in which the major portion of a synthetic resin layer is made of this specific polyurethane type thermoplastic resin. Namely, the present invention provides laminated safety glass having an at least two-layered structure comprising an inorganic glass layer and a synthetic resin layer, and having an inorganic glass surface on one side and a synthetic resin surface on the other side, characterized in that the major portion of the synthetic resin layer comprises a polyurethane type thermoplastic resin, said polyurethane type thermoplastic resin being a resin obtained from a high molecular weight diol composed of a combination of from 40 to 70% by weight of a poly(1,6-hexylene carbonate)diol and from 30 to 60% by weight of a polyester diol, a chain extender, and a non-yellowing type diisocyanate compound, as essential starting materials.

Now, the present invention will be described in detail with reference to the preferred embodiments.

In the accompanying drawings, FIGS. 1 to 4 are schematic cross-sectional views illustrating various embodiments of the laminated safety glass of the present invention.

Figure 1:
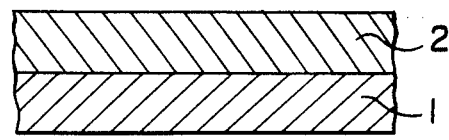
FIG. 1 illustrates a two-layered structure comprising a glass layer and a specific polyurethane layer.

In the present invention, the major portion of the synthetic resin layer is meant for a part or whole of the synthetic resin layer upon which the required mechanical properties may mainly depend, and is not determined only by a thickness of the layer. For instance, in the case where the synthetic resin layer is of a two-layered structure comprising a polyurethane type thermoplastic resin layer and an outermost layer of a polyurethane type thermosetting resin which is provided for improving the surface properties, the polyurethane type thermoplastic resin layer may not necessarily be required to be thicker than the polyurethane type thermosetting resin layer. The reason is that the mechanical properties of the polyurethane type thermoplastic resin are by far superior to those of the polyurethane type thermosetting resin having the same thickness. Whereas, the polyurethane type thermosetting resin is required to have at least a certain level of a thickness so as to exhibit surface properties such as self-restoration properties. Accordingly, at least about $\frac{1}{3}$, preferably at least about $\frac{1}{2}$, in thickness, of the synthetic resin layer may consist of the polyurethane type thermoplastic resin layer. It is more preferred that substantially the whole or at least $\frac{2}{3}$ in thickness, of the synthetic resin layer consists of the polyurethane type thermoplastic resin layer. Further, from the viewpoint of the required mechanical properties, the polyurethane type thermoplastic resin layer should better have a thickness of at least 0.2 mm, preferably in a range of from 0.2 to 10 mm, more preferably in a range of from 0.4 to 2 mm. The polyurethane type thermoplastic resin layer may consist of two or more layers. In such a case, the above-mentioned thickness represents the total thickness of such layers. Further, in the present invention, the synthetic resin layer does not include a so-called intermediate film layer of polyvinyl butyral or a polyurethane type resin interposed between a pair of glass sheets. In the resin-laminated glass of the present invention, substantially all of the above-mentioned polyurethane type thermoplastic resin is a polyurethane type thermoplastic resin obtained by using the specific high molecular weight diol. Needless to say, in the case where the polyurethane type thermoplastic resin layer consists of two or more layers, a layer which plays a minor role in the required mechanical properties and is extremely thinner than the major polyurethane type thermoplastic resin layer, may be made of another polyurethane type thermoplastic resin. It is preferred that the polyurethane type thermoplastic resin layer in the synthetic resin layer consists essentially of a single layer, and such a layer is composed of a polyurethane type thermoplastic resin obtained by using the above-mentioned specific high molecular weight diol.

The specific polyurethane type thermoplastic resin according to the present invention is composed of a combination of from 40 to 70% by weight of a poly(1,6-hexylene carbonate)diol and from 30 to 60% by weight of a polyester diol, preferably a combination of from 45 to 65% by weight of a poly(1,6-hexylene carbonate)diol and from 35 to 55% by weight of a polyester diol. The poly(1,6-hexylene carbonate)diol has a molecular weight of from about 800 to about 4000, preferably from about 1500 to about 3000, and a softening point of about 40° C. The poly(1,6-hexylene carbonate) diol may suitably be prepared by the reaction of 1,6-hexanediol with diallyl carbonate, but may also be prepared by other methods such as the reaction of 1,6-hexanediol with phosgene or a dialkyl carbonate. The polyester diol has a molecular weight of from about 800 to about 4000, preferably from about 1500 to about 3000. The polyester diol is a diol having a residual group of a dihydric alcohol and a residual group of a dibasic carboxylic acid, or a diol having a residual group of a ring opened cyclic ester such as a ring opened polymer of a cyclic ester. Each of the residual groups may be a mixture of two or more respective compounds, and the diol may have all the three types of the residual groups. As the dihydric alcohol, it is possible to use a non-aliphatic diol such as 2,2-bis(4-hydroxycyclohexyl)-propane or 2,2-bis(4-hydroxyethoxyphenyl)propane. However, preferred is an aliphatic diol, and particularly preferred is a saturated aliphatic diol having from 2 to 8 carbon atoms. As specific examples of such a dihydric alcohol, there may be mentioned ethylene glycol, propylene glycol, 1,3-propanediol, 1,4-butanediol, neopentyl glycol, 1,6-hexanediol and a polyalkylene glycol such as diethylene glycol or dipropylene glycol. Likewise, as the dibasic carboxylic acid, it is possible to use a non-aliphatic dibasic carboxylic acid. However, preferred is a saturated dibasic carboxylic acid having from 2 to 12 carbon atoms, such as maleic acid, succinic acid, adipic acid, azelaic acid or sebacic acid. As the cyclic ester, $\epsilon$ caprolactone and the like is suitable. There is no particular restriction as to a method for producing a polyester diol from such a dihydric alcohol, dibasic carboxylic acid and cyclic ester. For instance, the polyester diol may be produced by the direct reaction of a dihydric alcohol with a dibasic carboxylic acid, by the reaction of a dihydric alcohol with a dibasic carboxylic acid derivative such as acid chloride, or by the ester exchange reaction. Particularly preferred polyester diols are a poly(1,4-butylene adipate)diol, a poly(1,4-butylene azelate)diol, a poly(ethylene adipate)diol a poly(1,6-hexylene adipate)diol, a poly($\epsilon$-caprolactone)diol, a poly(1,4-butylene adipate)-($\epsilon$-caprolactone) copolymerized polyester diol, etc.

As the chain extender, there may preferably be employed a dihydric alcohol having a low molecular weight and a diamine. Its molecular weight is preferably at most about 400, more preferably at most about 250. As the dihydric alcohol, there may be used such dihydric alcohols as mentioned above, and particularly preferred is a saturated aliphatic dihydric alcohol having from 2 to 8 carbon atoms. Further, in some cases, there may be used a carboxylic acid group-containing dihydric alcohol such as $\alpha$, $\alpha$-dimethylol propionic acid or dimethylol acetic acid. However, in most cases, the carboxylic acid group-containing polyurethane type thermoplastic resin is inferior in the stability against hydrolysis. As the diamine, there may be used hexamethylenediamine, tolylenediamine, diaminodiphenylmethane, isophoronediamine, MOCA and other diamines. Such chain extenders may be used alone or in combination as a mixture of two or more different kinds. The chain extender may also be used in combination with a small amount of a cross-linking agent (i.e. a low molecular weight tri- or higher hydric alcohol or an amine). The cross-linking agent should not be used in such a large amount that the resulting polyurethane type resin loses its thermoplasticity. As the cross-linking agent, there may be mentioned, for instance, trimethylolpropane, glycerin or triethanolamine.

The non-yellowing type diisocyanate compound is a diisocyanate compound containing no isocyanate group directly bonded to an aromatic ring. For instance, it may be a diisocyanate compound having an aromatic ring, such as xylylene diisocyanate. However, preferred is an aliphatic or cycloaliphatic diisocyanate compound having no aromatic ring. As specific exmaples of such a diisocyanate compound, there may be mentioned, for instance, 4,4'-methylenebis(cyclohexyl isocyanate), 1,6-cyclohexane diisocyanate, 1-methyl-2,4 (or 2,6)-cyclohexane ediisocyanate, isophorone diisocyanate, hexamethylene diisocyanate, and the like. Such non-yellowing type diisocyanate compounds include modified compounds such as a urea modified compound, a prepolymer type modified compound, a carbodiimide modified compound or a burette modified compound. The non-yellowing type diisocyanate compounds may be used alone or in combination as a mixture of a two or more different kinds. Particularly preferred non-yellowing type diisocyanate compounds are 4,4'-methylenebis-(cyclohexyl isocyanate) and isophorone diisocyanate.

The amount of the chain extender is suitably from about 1.0 to about 10.0 equivalents relative to 1 equivalent of the total of high molecular weight diols. If the amount of the chain extender is less than about 1.0 equivalent, the polyurethane type thermoplastic resin thereby obtained tends to be too flexible, and no adequate mechanical properties required for resin-laminated glass will be obtainable. Rigidity can be increased by incorporating a small amount of a cross-linking agent, but even when such a cross-linking agent is used, the amount of the total of the cross-linking agent and the chain extender is preferably at least about 1.0 equivalent relative to 1 equivalent of the high molecular weight diol. A more preferred lower limit of the amount of the chain extender is about 2.0 equivalents relative to 1 equivalent of the high molecular weight diol. On the other hand, if the amount of the chain extender exceeds the above-mentioned upper limit, the polyurethane type thermoplastic resin tends to be too rigid, and the impact resistance or other mechanical properties tend to be inferior. A more preferred upper limit of the amount of the chain extender is about 6.0 equivalents relative to 1 equivalent of the high molecular weight diol. The amount of the non-yellowing type diisocyanate compound is preferably from about 0.90 to about 1.15 equivalents, more preferably 0.95 to about 1.10 equivalents, relative to 1 equivalent of the total of the high molecular weight diol and the chain extender (a total inclusive of the cross-linking agent, in the case of using the cross-linking agent).

The polyurethane type thermoplastic resin according to the present invention may be prepared optionally by using other components in addition to the above-mentioned three major starting materials. Among the optional components, it is usual to use a catalyst as an essential component. As the catalyst, there may be used, for instance, a tertiary amine catalyst, an organic metal compound catalyst such as an organic tin compound, or other various catalysts useful for the preparation of a polyurethane. The use of an organic tin compound such as dibutyltin dilaurate, is particularly preferred. Further, from the aspect of improvement for e.g. weather resistance, it is preferred to incorporate a ultraviolet absorbing agent, a photo-stabilizer, an anti-oxidation agent or other stabilizers during or after the preparation of a polyurethane type thermoplastic resin. It is possible to further incorporate various components such as a coloring agent. A method for preparing a polyurethane type thermoplastic resin is not critical, and there may be employed a prepolymer method, a quasi-prepolymer method or a one-shot method. The use of the prepolymer method is particularly preferred.

The resin-laminated glass may be prepared by a direct mold-pouring method wherein a mixture of the above-mentioned starting materials are directly molded between glass and a mold material as will be described hereinafter. However, it may preferably be prepared by a laminating method wherein a sheet or film of a polyurethane type thermoplastic resin is firstly prepared, and then the sheet or film is laminated with glass or further other materials. The sheet or film of a polyurethane type thermoplastic resin may be prepared by molding a polyurethane type thermoplastic resin, which has already been formed, e.g. by means of an extrusion molding. Further, such a sheet or film may directly be prepared by molding a starting material mixture on a flat surface.

There has been known a polyurethane type thermoplastic resin wherein a poly(1,6-hexylene carbonate)diol and a polyester diol are used as the high molecular weight diol. For instance, U.K. Patent No. 1,179,222 discloses a polyurethane type thermoplastic resin wherein from 10 to 50% by weight of a poly(1,6-hexylene carbonate)diol and from 50 to 90% by weight of a polyester diol are used as the high molecular weight diol. This reference, however, does not disclose or suggest any application of the synthetic resin for laminated safety glass, such as the synthetic resin layer of the resin-laminated glass according to the present invention or an intermediate film layer in two-ply glass. For the polyurethane type thermoplastic resin useful for the resin-laminated glass, it is essential to use a non-yellowing type diisocyanate compound, and it is required to be a relatively rigid elastomer. Referring to the latter requirement, although there is no specific description as to the amount of the chain extender in this reference, it appears from Examples that the amount of the chain extender is at most about 0.5 equivalent relative to a total of high molecular weight diols. With use of such a small amount of the chain extender, the polyurethane type thermoplastic resin thereby obtained is not suitable for resin-laminated glass. On the other hand, the above-mentioned U.S. Pat. No. 3,764,457 or 4,103,070 discloses the use of a polyurethane type thermoplastic resin wherein a polycarbonate diol other than a poly(1,6-hexylene carbonate)diol is used, for the resin-laminated glass. For example, as explained from column 4, line 51 to column 6, line 31, the former discloses a polycarbonate diol obtained by the reaction of a 1,2-epoxide with carbon dioxide or a cyclic carbonate, or by the reaction thereof with a 1,2-epoxide. The latter discloses a polycarbonate diol containing a residual group of a cycloaliphatic diol. As far as the Examples are concerned, the polycarbonate diol disclosed in the former appears to be substantially a polyethylene glycol carbonate diol alone. Such a polyethylene glycol carbonate diol has a residual group of polyethylene glycol and thus is highly hydrophilic, and accordingly, there will be a problem that the polyurethane type thermoplastic resin obtained by using such a diol, is inferior e.g. in weather resistance. As a matter of fact, the latter reference by the same applicant discloses that a polyurethane type thermoplastic resin obtained by the former invention, is likely to deteriorate by ultraviolet rays and thus is not suitable for the resin-laminated glass. The polycarbonate diol described in the latter reference is a special polycarbonate diol, and is hardly available and difficult to produce. Accordingly, it is not yet practically useful. Further, out of the two references wherein the use of the above-mentioned resin-laminated glass is disclosed, the former reference discloses use of a polycarbonate diol in combination with a polyester diol. However, it is disclosed that when a polyester diol is used, the amount of the polyester diol is at most about 45% by weight, particularly from about 10 to about 30% by weight of the polycarbonate diol at maximum (see in column 9, lines 66 to 73). Namely, the amount of the polyester diol is at most about 31% by weight, particularly from about 9 to about 23% by weight of a mixture of the polycarbonate diol and the polyester diol. The use of such a small amount of the polyester diol cannot solve problems inherent to the special polycarbonate diol per se of the invention.

The polyurethane type thermoplastic resin according to the present invention, has extremely excellent mechanical properties useful for resin-laminated glass as well as other physical properties such as transparency, stability against hydrolysis or weather resistance. Further, when the present invention is compared with a polyurethane type thermoplastic resin using a polyester diol alone, the one using a polyester diol alone is inferior in the stability against hydrolysis to the present invention. Whereas, the one using a polycarbonate diol alone has a difficulty in handling in the preparation of a urethane type thermoplastic resin because of a high viscosity of the polycarbonate diol when melted. Besides, in consideration of the polycarbonate diol being expensive, the present invention is also economically advantageous in that the same properties are obtainable at a lower cost.

FIGS. 1 to 4 are the schematic cross-sectional views showing four embodiments of the laminated safety glass of the present invention. In all the Figures, a glass layer 1 and a specific polyurethane type thermoplastic resin layer 2 (hereinafter referred to as "specific polyurethane layer"), respectively, are shown in common.

FIG. 1 is a cross-sectional view showing resin-laminated glass consisting essentially of two layers of the glass layer 1 and the specific polyurethane layer 2. An extremely thin adhesive layer may present at an interface between the glass layer 1 and the specific polyurethane layer 2. However, the adhesive layer is not usually required since the polyurethane type thermoplastic resin by itself is bonded relatively firmly to glass. In order to further increase a bonding strength between both materials, it is effective to preliminarily treat the surface of glass, which will constitute an interface, with a silicon compound useful as a coupling agent. In the case where the properties such as the solvent resistance or self-restoration properties are not particularly required, the exposed surface of the specific polyurethane layer 2 may be as it is, without being subjected to treatment. In the case where the solvent resistance and the like is required, it is preferred to conduct surface treatment e.g. to treat this surface with a cross-linking agent. For example, it is possible to employ a method wherein a compound having an α,β-unsaturated group is grafted to or impregnated from the surface and then the compound is cross-linked or polymerized by light or heat, or a method wherein a moisture cross-linkable group such as an alkoxysilyl group is grafted for moisture cross-linking.

Figure 2:
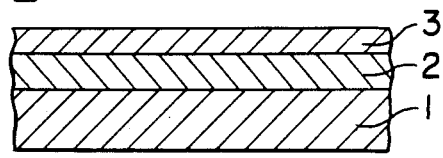
FIG. 2 illustrates a three-layered structure comprising a glass layer, a specific polyurethane layer and another polyurethane layer.

FIG. 2 is a cross sectional view showing resin-laminated glass consisting essentially of a three-layered structure wherein a polyurethane type thermoplastic or thermosetting resin layer 3 having the self-restoration properties, is provided on the outer side of the specific polyurethane layer, 2. The polyurethane type thermosetting resin layer 3 serves mainly to provide the surface properties such as the self-restoration properties or solvent resistance, and the specific polyurethane layer 2 serves mainly to provide the desired mechanical properties.

Figure 3:
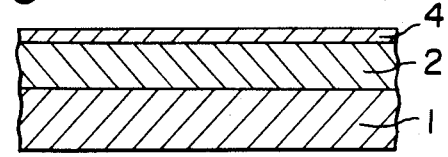
FIG. 3 illustrates a three-layered structure similar to the one shown in FIG. 2.

FIG. 3 is a cross sectional view showing resin-laminated glass consisting essentially of a three-layered structure having a polyurethane type thermoplastic resin layer 4 which is different from the specific polyurethane layer 2. The reason why another polyurethane type thermoplastic resin layer 4 is provided on the outer side of the specific polyurethane layer 2 is that the above-mentioned surface treatment is thereby readily conducted, or that it is thereby possible to employ a polyurethane type thermoplastic resin superior in the surface properties (inferior in other properties) to the specific polyurethane layer 2.

For instance, in the case of the surface treatment, the polyurethane type thermoplastic resin of the specific polyurethane layer 2, preferably should not be a carboxylic acid group-containing polyurethane type thermoplastic resin obtained by using a dihydric alcohol chain extender having the above-mentioned carboxylic acid group, from the viewpoint of e.g. stability against hydrolysis. Whereas, it should preferably be a polyurethane type thermoplastic resin having a reactive group, such as a carboxylic acid group-containing polyurethane type thermoplastic resin, in order to conduct surface treatment such as the grafting of a surface treating agent. Accordingly, as the thermoplastic resin different from the specific polyurethane layer 2, there may preferably employed a polyurethane type thermoplastic resin other than the specific polyurethane type thermoplastic resin according to the present invention, or, within the scope of the specific polyurethane type thermoplastic resin according to the present invention, a polyurethane type thermoplastic resin (e.g. the one having a carboxilic acid group) different from that of the specific polyurethane layer 2.

Figure 4:
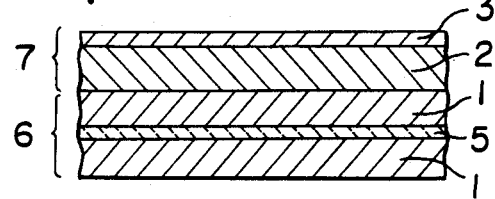
FIG. 4 illustrates a five-layered structure wherein a glass layer is of a three-layered structure.

FIG. 4 is a cross-sectional view of resin laminated glass wherein as a glass layer having a multi-layered structure is used as the glass layer. The glass layer having a multi-layered structure is made of a two-ply glass 6 having an intermediate film 5 such as polyvinyl butyral. The synthetic resin layer 7 may be made of the specific polyurethane layer 2 alone as shown in FIGS. 1 to 3, or may be of a multi-layered structure containing the specific polyurethane layer 2. FIG. 4 shows resin-laminated glass wherein the polyurethane type thermosetting resin layer 3 as has already explained in the case of FIG. 2, is provided on the outer side of the specific polyurethane layer 2.

The laminated safety glass of the present invention may be prepared by a known method. As such a known method, there has been known a direct mold-pouring method, but a laminating method is preferably employed. The direct mold-pouring method is the one which comprises pouring a polyurethane type resin material between a glass sheet and a releasing mold material, then curing the polyurethane type resin and removing the mold material. The laminating method is the one which comprises press-bonding under heating one or more synthetic resin sheets or films and glass for fusion bonding. For instance, glass, a synthetic resin sheet and a mold material are assembled and press-bonded under heating, and then the mold material is removed to prepare resin-laminated glass. This method has a feature such that a bonding strength between a glass layer and a synthetic resin layer is high, and a smooth surface is obtainable by pressing with the mold material. Further, a roll-pressing and the like may be conducted without use of a mold material. As the synthetic resin sheet or film, there may be used a single layered sheet or film having the specific polyurethane type thermoplastic resin alone, or a multi-layered sheet or film having such a specific resin with other synthetic resin layers. Further, such a single or multi-layered sheet or film may be laminated simultaneously with other synthetic resin sheets or films. As the mold material, a glass sheet, a metal sheet and other smooth sheets are suitable. Further, it is preferred to preliminarily form a surface treated with a releasing compound, and it is also possible to form e.g. a releasing film. In the case of the laminating method, it is preferable to employ a heat press-bonding method using an autoclave, or to employ a two step method comprising a preliminary laminating and a main laminating.

The laminated safety glass of the present invention is preferably colorless transparent or colored transparent. As the glass, silicate glass to be used as a known window material is suitable, and it may be strengthened by air-cooling or with chemicals. Further, the glass may be two-ply glass comprising a laminate body of a pair of glass sheets and an intermediate film interposed between them.

The laminated safety glass of the present invention is suitable for use as a window material, particularly front glass, for automobiles. However, its use is not restricted to these specific examples, and it may be used as e.g. a window material for buildings.

Now, the present invention will be described in further detail with reference to Examples. However, it should be understood that the present invention is by no means restricted to these specific Examples.

EXAMPLE 1

600 g of poly(1,6-hexylene carbonate)diol having a hydroxyl group value of 56.0 and 400 g of poly(1,4-butylene adipate)diol having a hydroxyl group value of 54.0 were subjected to agitation, deaeration, and dehydration at a temperature of 110° C. under the vacuum of 3 mmHg. To this, 531 g of 4,4'-methylenebis(cyclohexyl isocyanate) and 0.01 g of dibutyltin dilaurate were added, and the batch was subjected to a reaction at a temperature of 80° C. for 20 minutes in a nitrogen stream. Subsequently, 135 g of 1,4-butanediol was added to this reaction mixture and quickly agitated. With commencement of the reaction, heat generation occurred and a substantially uniform mixture was obtained. This liquid reaction mixture was charged in a dry vessel coated with a fluorine resin, which vessel was placed and heated in a nitrogen-purged furnace at a temperature of 130° C. for 15 hours until the reaction substantially completed. The produced polymer was then granulated by means of a granulator. This granular polymer was formed into a sheet by an ordinary method by means of an extruder having its maximum cylinder temperature of 180° C., whereby a transparent resin sheet having a thickness of 0.5 mm was obtained.

Then, with use of this sheet, a resin-laminated glass was manufactured by a heat pressing method. Namely, the resin sheet of 0.6 mm thick was interposed between glass sheets having a size of 30 cm×30 cm, and then the laminate was press-bonded under heating in an appropriate autoclave. In this case, one of the glass sheets was uniformly coated in advance, on its one surface to be in contact with the resin sheet, with polydimethyl siloxane and heat-treated at 350° C., while the other glass sheet was uniformly coated, on its one surface to be in contact with the resin sheet, with γ-glycydoxypropyltrimethoxysilane. The autoclave was firstly evacuated to remove air existing between the glass sheets and the resin sheet, followed by heating the laminate under vacuum at a temperature of 120° C., thereby carrying out the preliminary press-bonding. After opening, the autoclave was maintained for about 30 minutes at a temperature of 150° C. and under a pressure of 13 kg/cm². After this, the laminate was taken out from the autoclave, and one of the glass sheets was removed from the laminate, thereby obtaining a resin-laminated glass.

In the same manner as above, urethane sheets having a thickness of 0.5 mm were produced from the respective compositions as shown in the following Examples, and resin-laminated glasses were manufactured.

EXAMPLE 2

| | |
|---|---|
| Poly(1,6-hexylene carbonate)diol having a hydroxyl group value of 56 | 50 g |
| Poly(1,4-butylene adipate)diol having a hydroxyl group value of 54 | 450 g |
| 4'4-Methylenebis(cyclohexyl isocyanate) | 536 g |
| 1,4-Butanediol | 131 g |
| Dibutyltin dilaurate | 0.01 g |

EXAMPLE 3

| | |
|---|---|
| Poly(1,6-hexylene carbonate)diol having a hydroxyl group value of 56 | 550 g |
| Poly(ethylene adipate)diol having a hydroxyl group value of 55 | 450 g |
| 4'4-Methylenebis(cyclohexyl isocyanate) | 533 g |
| 1,4-Butanediol | 134 g |
| Dibutyltin dilaurate | 0.01 g |

EXAMPLE 4

| | |
|---|---|
| Poly(1,6-hexylene carbonate)diol having a hydroxyl group value of 56 | 600 g |
| Poly(ethylene adipate)diol having a hydroxyl group value of 55 | 400 g |
| Isophorone diisocyanate | 617 g |
| 1,4-Butanediol | 201 g |
| Dibutyltin dilaurate | 0.01 g |

EXAMPLE 5

| | |
|---|---|
| Poly(1,6-hexylene carbonate)diol having a hydroxyl group value of 56 | 550 g |
| Poly(1,4-butylene adipate)diol having a hydroxyl group value of 54 | 450 g |
| Isophorone diisocyanate | 617 g |
| 1,4-Butanediol | 201 g |
| Dibutyltin dilaurate | 0.01 g |

EXAMPLE 6

| | |
|---|---|
| Poly(1,6-hexylene carbonate)diol having a hydroxyl group value of 56 | 650 g |
| Poly(ε-caprolactone)diol having a hydroxyl group value of 56 | 350 g |
| 4'4-Methylenebis(cyclohexyl isocyanate) | 533 g |
| 1,4-Butanediol | 133 g |
| Dibutyltin dilaurate | 0.01 g |

EXAMPLE 7

| | |
|---|---|
| Poly(1,6-hexylene carbonate)diol having a hydroxyl group value of 56 | 600 g |
| Poly(ε-caprolactone)diol having a hydroxyl group value of 56 | 400 g |
| Isophorone diisocyanate | 617 g |
| 1,4-Butanediol | 201 g |
| Dibutyltin dilaurate | 0.01 g |

EXAMPLE 8

| | |
|---|---|
| Poly(1,6-hexylene carbonate)diol having a hydroxyl group value of 56 | 600 g |
| Poly(1,4-butylene adipate)diol having a hydroxyl group value of 54 | 400 g |
| Isophoraone diisocyanate | 666 g |
| Ethylene glycol | 152 g |
| Dibutyltin dilaurate | 0.01 g |

COMPARATIVE EXAMPLE 1 (Polyester diol was used alone.)

| | |
|---|---|
| Poly(1,4-butylene adipate)diol having a hydroxyl group value of 54 | 1000 g |
| 4'4-Methylenebis(cyclohexyl isocyanate) | 436 g |
| 1,4-Butanediol | 102 g |
| Dibutyltin dilaurate | 0.01 g |

COMPARATIVE EXAMPLE 2 (Polycarbonate diol was used alone.)

| | |
|---|---|
| Poly(1,6-hexylene carbonate)diol having a hydroxyl group value of 56 | 1000 g |
| 4'4-Methylenebis(cyclohexyl isocyanate) | 533 g |
| 1,4-Butanediol | 134 g |
| Dibutyltin dilaurate | 0.01 g |

The test results of each of the foregoing Examples and Comparative Examples, are shown in Table 1.

having from 2 to 8 carbon atoms and a residual group of a saturated dibasic carboxylic acid having from 2 to 12

TABLE 1

| | Test method | | Example 1 | 2 | 3 | 4 | 5 | 6 | 7 | 8 | Comparative Example 1 | 2 |
|---|---|---|---|---|---|---|---|---|---|---|---|---|
| Operation efficiency | Easiness for handling during synthesis of a urethane type thermoplastic resin | | Easy to defoam | ← | ← | ← | ← | ← | ← | ← | ← | Difficult to defoam |
| Strength of resin | Tensile strength (kg/cm$^2$) | | 650 | 665 | 660 | 653 | 680 | 650 | 678 | 685 | 610 | 650 |
| | Elongation (%) at breakage | | 430 | 440 | 445 | 470 | 465 | 440 | 432 | 423 | 490 | 440 |
| Penetration resistance | Sheet thickness at which a steel ball does not penetrate when fallen from the height of 4 mm | | 0.4–0.5 | ← | ← | ← | ← | ← | ← | ← | 0.5–0.6 | 0.4–0.5 |
| Humidity and heat resistance test | Change after being kept for at 50° C. and under a relative humidity of 98% | Surface condition | No change | ← | ← | ← | ← | ← | ← | ← | No change | No change |
| | | Retention (%) of strength | 95 | | | | | | | | 90 | 95 |
| Boiling resistance test | Change after boiling for 2 hours | Surface condition | Slightly roughened | ← | ← | ← | ← | ← | ← | ← | Roughened | Slightly roughened |
| | | Retention (%) of strength | 98 | 97 | 96 | 95 | 99 | 98 | 100 | 100 | 87 | 97 |
| Weather resistance test | Change after being exposed for 1000 hours by means of sunshine weatherometer | Retention (%) of strength | 98 | 100 | 98 | 96 | 100 | 98 | 97 | 70 | 97 | 97 |

We claim:

1. A liminated safety glass having an at least two layered structure of an inorganic glass layer and a synthetic resin layer, said laminated structure having an exterior glass surface on one side and a synthetic resin surface on the other side, with the major portion of the synthetic resin layer comprising a polyurethane type thermoplastic resin being obtained by the reaction of a high-molecular weight diol composed of a combination of from 40 to 70% by weight of a poly-(1,6-hexylene 1 carbonate)diol having a molecular weight of from about 800 to about 4000 and from 30 to 60% by weight of a polyester diol having a molecular weight of from about 1500 to about 3000, said polyester diol being a compound or mixture of compounds having dihydric alcohol and dibasic carboxylic acid groups, residual ring opened cyclic ester groups or combinations thereof, with a non-yellowing type of diisocyanate compound in the presence of from about 1.0 to about 10.0 equivalents, relative to one equivalent of the total amount of diol reactant of a chain extender, as essential ingredients, said diisocyanate compound being present in an amount of from about 0.90 to about 1.15 equivalents, per one equivalent of the total amount of said diol and chain extender, and said diisocyanate not having isocyanate groups directly bonded to an aromatic ring in the event the diisocyanate compound contains an aromatic ring, and said chain extender being a diol having a molecular weight of at most 400 and a diamine.

2. The laminated safety glass according to claim 1 wherein the chain extender is used in an amount of from about 2.0 to about 6.0 equivalents relative to 1 equivalent of the high molecular weight diol.

3. The laminated safety glass according to claim 1 wherein the poly(1,6-hexylene carbonate)diol has a molecular weight of from about 1500 to about 3000.

4. The laminated safety glass according to claim 1 wherein the polyester diol is an aliphatic polyester diol comprising a residual group of a saturated aliphatic diol carbon atoms.

5. The laminated safety glass according to claim 1 wherein the polyester diol is poly(ε-caprolactone)diol.

6. The laminated safety glass according to claim 1 wherein the high molecular weight diol comprises from 45 to 65% by weight of a poly(1,6-hexylene carbonate)diol and from 35 to 55% by weight of a polyester diol.

7. The laminated safety glass according to claim 1 wherein the chain extender is a dihydric alcohol having from 2 to 6 carbon atoms.

8. The laminated safety glass according to claim 1 wherein the chain extender comprises at least one compound selected from the group consisting of 1,4-butanediol and ethylene glycol.

9. The laminated safety glass according to claim 1 wherein the non-yellowing type diisocyanate compound comprises at least one compound selected from the group consisting of aliphatic diisocyanate compounds and cycloaliphatic diisocyanate compounds.

10. The laminated safety glass according to claim 9 wherein the non-yellowing type diisocyanate compound comprises at least one compound selected from the group consisting of 4,4'-methylenebis(cyclohexyl isocyanate) and isophorone diisocyanate.

11. The laminated safety glass of claim 1, wherein said synthetic resin layer has a thickness of at least 0.2 mm.

12. The laminated safety glass of claim 1, wherein the diol combination of ingredients is from 45 to 65% by weight poly (1,6-hexylene carbonate)diol and from 35 to 55% by weight polyester diol.

13. The laminated safety glass of claim 1, wherein said polyester diol is poly (1,4-butylene adipate)diol, poly (1,4-butylene aelate)diol, poly (ethylene adipate)-diol, poly (1,6-hexylene adipate) diol, poly (ε-caprolactone)diol or poly-(1,4-butylene adipate)-(ε-caprolactone).

* * * * *